United States Patent [19]
Chipman et al.

[11] Patent Number: 6,000,798
[45] Date of Patent: Dec. 14, 1999

[54] OPHTHALMIC OPTIC DEVICES

[75] Inventors: Russell A. Chipman, Salem, Va.;
Patrick Reardon, Madison, Ala.;
Amitava Gupta, Roanoke, Va.

[73] Assignee: Innotech Inc., Roanoke, Va.

[21] Appl. No.: 08/944,144

[22] Filed: Oct. 6, 1997

[51] Int. Cl.⁶ ........................................................ G02C 7/02
[52] U.S. Cl. ............................................. 351/176; 351/159
[58] Field of Search ..................................... 351/176, 169, 351/172, 159, 160 R, 160 H, 161, 168; 623/6

[56] References Cited

U.S. PATENT DOCUMENTS

| | | | |
|---|---|---|---|
| 2,878,721 | 3/1959 | Kanolt | 88/54 |
| 3,687,528 | 8/1972 | Maitenaz | 351/169 |
| 4,056,311 | 11/1977 | Winthrop | 351/169 |
| 4,274,717 | 6/1981 | Davenport | 351/169 |
| 4,315,673 | 2/1982 | Guilino et al. | 351/169 |
| 4,679,918 | 7/1987 | Ace | 351/163 |
| 4,861,153 | 8/1989 | Winthrop | 351/169 |
| 4,946,270 | 8/1990 | Guilino et al. | 351/169 |
| 5,148,205 | 9/1992 | Guilino et al. | 351/176 |
| 5,455,642 | 10/1995 | Kato | 351/169 |
| 5,488,442 | 1/1996 | Harsigny et al. | 351/169 |
| 5,550,600 | 8/1996 | Ueno | 351/159 |
| 5,644,374 | 7/1997 | Mukaiyama et al. | 351/169 |
| 5,771,089 | 6/1998 | Barth | 351/169 |

FOREIGN PATENT DOCUMENTS

| | | |
|---|---|---|
| 62-90053 | 4/1987 | Japan . |
| 876798 | 9/1961 | United Kingdom . |

*Primary Examiner*—Georgia Epps
*Assistant Examiner*—Jordan M. Schwartz

[57] ABSTRACT

A novel ophthalmic lens is provided. The lens includes an astigmatism subtracting surface that removes unwanted astigmatism caused by other elements of the lens.

24 Claims, 1 Drawing Sheet

OPHTHALMIC OPTIC DEVICES

FIELD OF THE INVENTION

This invention relates to the correction of astigmatic errors in ophthalmic lenses. Most specifically it relates to correction of such errors in spectacle lenses.

BACKGROUND OF THE INVENTION

One of the problems encountered by lens designers is that of astigmatic error. This refers to astigmatic errors caused by ophthalmic lenses themselves, as opposed to an astigmatism that exists as part of a patient's uncorrected vision.

Astigmatic error can be found in almost any ophthalmic lens, including single-vision lenses used to correct near-sightedness. It is a particularly significant problem in multifocal lenses, including progressive addition lenses (PAL's), which are a special case of such lenses.

Progressive addition lenses for correction of presbyopia have been the subject of extensive research and development over the past five decades, as reported in the patent literature. All progressive lens optics consist of two refracting surfaces. The anterior surface contains a non-spherical shape which provides the different powered regions, and the posterior surface is either a pure sphere or a toric which provides the base power or provides the base power and corrects for the user's astigmatism respectively. The front surface geometry is optimized to minimize unwanted astigmatism and other aberrations, provide a first optical zone with minimal astigmatic aberrations for viewing distant objects, a second optical zone with a higher spherical power for viewing near objects, and a third optical zone connecting the first two zones, of variable spherical power for providing intermediate vision. In an early design, shown in U.S. Pat. No. 2,878,721, the unwanted astigmatism was spread out over the entire optic, thus reducing the peak astigmatism. But the connecting intermediate zone does not provide a smooth transition in refractive power, and the residual unwanted astigmatism in the distance and the near viewing zones remains unacceptably high. In more recent progressive designs, the zones designed for distance and near vision are kept spherical, while the unwanted astigmatism which inevitably comes from connecting the distance and near zones with a smooth, continuous surface is (1) spread over as large an area of the optic as possible in order to reduce the maximum unwanted astigmatism, (2) spread out more evenly. See, for example, U.S. Pat. Nos. 4,056,311 and 4,315,673. In all cases, the posterior surface of the optic is left spherical or toroidal, and is not designed to provide correction of unwanted astigmatic error caused by a progressive lens surface itself. As a result, even after fifty years of research and development, state of the art progressive addition lenses have numerous shortcomings, including high levels of peripheral astigmatism, significant peripheral refractive errors, narrow channel width, as well as insufficient widths of the near and distance power zones, limiting peripheral vision. Design of ophthalmic lens optics eschew optimization of the posterior surface, because the conventional method of fabrication of progressive addition lens optics precludes development and specification of complex geometries for the posterior surface, as will be made clearer in the subsequent section. Indeed, the aspheric correction provided to minimize the unwanted astigmatism inherent in single vision lenses, are also confined to the front surface of the optic.

All of these methods of dealing with unwanted astigmatic errors involve managing the error by distributing it over larger or remote areas of the lens or other such techniques. None actually eliminate the astigmatic error.

Previously known methods of fabrication of ophthalmic lens optics may have so far prevented optics designers from providing aspheric corrections to the posterior surface of the optic, and also from proposing multilayer optics incorporating intermediate or "buried" surfaces. The method of fabrication of ophthalmic optics begins with the casting a semi finished blank from an optical material which incorporates the front (anterior) surface of the optic in finished form, often coated with a scratch resistant layer. This semi finished blank is subsequently custom ground and polished in regional grinding laboratories, or occasionally in retail locations to fit a particular prescription. The posterior surface is thus rendered spherical or toroidal, depending on the prescription, the axis of the cylinder correction being set by placing the principal meridian passing through the optical center of the distance power zone and the optical center of the near power zone at the appropriate angular orientation with reference marks on the mounting fixture used to hold the blank during the machining process. For the most part, the grinding and polishing equipment used in finishing labs is only capable of providing spherical or toroidal curves, hence for the ophthalmic optics to be available widely, the optics designer can not rely upon the posterior surface to be aspheric or corrective.

There is thus a need to develop designs for ophthalmic lens optics in which the posterior surface of the optic and/or intermediate surfaces are designed to eliminate as nearly as possible the unwanted astigmatism induced by the continuous change of the radius of curvature of the front surface required for intermediate vision, and to provide methods of their fabrication.

DETAILED DESCRIPTION OF THE INVENTION

Figure 1:
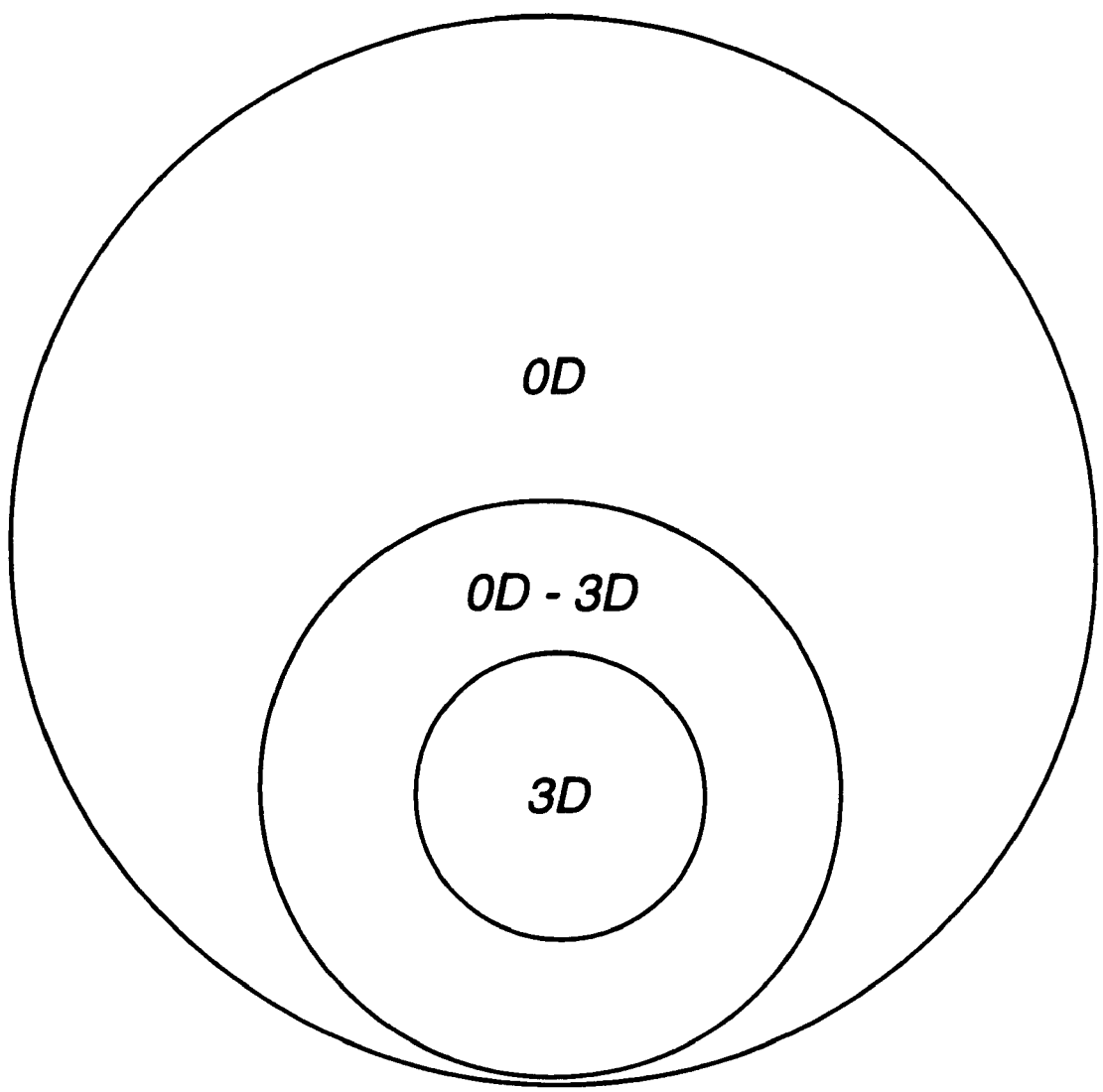
FIG. 1 depicts a surface of a lens of the invention.

The current invention provides a lens with an anterior surface that provides or contributes to the desired visual correction (such as a PAL lens). The anterior surface can be designed to achieve this correction without regard to any possible astigmatic errors that may be produced. Lenses according to this invention have a posterior surface that is shaped so that the lens' optical properties subtract out these astigmatic errors. The term "subtract out" encompasses significant reductions in unwanted astigmatism, not just the complete elimination of the astigmatism.

If the lens has a homogeneous composition, this astigmatism-subtracting surface is the posterior surface of the lens. In a multilayer lens, the astigmatism-subtracting surface can be the posterior surface or one of the intermediate surfaces that are posterior to the anterior surface of the lens. Such a design involves incorporation of one or more intermediate surfaces, each surface separating two optical materials of different refractive indices. The higher the difference in refractive indices on both sides of a surface, the more useful its role as a design element to minimize unwanted astigmatism. The design may also involve the use of a toroidal aspheric posterior surface designed to subtract out the peripheral astigmatism introduced by the anterior surface, without the use of any intermediate layer, or two different optical materials.

The present invention may be used in lenses having any astigmatism-producing surface. The shape of the astigmatism-subtracting surface will necessarily be dictated by the shape of the astigmatism-producing surface. There are a great many such astigmatism-producing surfaces and thus a great many astigmatism-subtracting surfaces. No single astigmatism-subtracting surface encompasses the full range of this invention. Also, while this invention is described by reference to an anterior astigmatism-producing surface, and a posterior astigmatism-subtracting surface, it easily encompasses other such arrangements.

Persons skilled in the art of lens design follow a set of generally known procedures to design a lens surface having desired properties. These are generally applicable to the design of an astigmatism-subtracting surface to be used in the present invention. See, for example, "Geometrical Optics and Optical Design," P. Pouroulis and J. MacDonald, Oxford Univ. Press (1997). An application of these methods may be described as follows.

The design process starts with the three dimensional description of the front surface, the progressive surface. The front surface may be described in the form of a sag table (x, y, z coordinates of a large number of points chosen to provide a high level of optical resolution, typically 1000 to 10,000 points over an 80 mm projection of "bowl diameter"). Alternatively, the front surface may be described by a bicubic spline surface which is suitable for describing arbitrary shapes or alternatively by a smooth analytical expression, such as those about to be presented: the radially symmetric polynomial, two dimensional polynomials, or anamorphic asphere.

The design process continues by choosing a surface type for the posterior surface and if present, the intermediate surface. These surfaces are described or parameterized by a set of coefficients which when varied generate a family of surfaces. The desired lens performance is specified; this includes but is not necessarily limited to specifying the power and astigmatism desired as a function of field angles, the desired image quality, and constructional parameters such as minimum thickness of the optical materials. A merit function is defined for the lens which generally includes nonnegative terms which calculates how close the lens is to the desired lens performance. The merit function typically includes sums of RMS (root mean square) spot sizes for images at various fields and wavelengths or similar image measures. The merit function may also include functions of aberration coefficients (such as astigmatism) and functions of the lens constructional parameters and other desired constraints on the lens geometry and performance.

The next step in the design process is to select a suitable starting point design for submission to an optimization program. An optimization routine will take an optical system prescription, and vary a list of coefficients to endeavor to minimize the merit function to yield a lens well corrected for aberrations which meets the specifications. If the final merit function is small enough, and the designer determines that the resulting lens performance is close enough to the specifications, then the lens design process is complete and the definitive lens is specified. However, an optimization program will only produce good final lens performance for a limited range of input surface coefficients. The definitive lens design is reached by testing various combinations of coefficients and understanding their individual effects. This process is guided by the lens designers experience and careful observation.

The functions utilized to represent the surfaces are either rotationally symmetric functions, including 20th order aspheres, or non-rotationally symmetric functions which include toroids, aspheric toroids, or anamorphic aspheres. The posterior surface can be similarly aspherized, toroidally aspherized, or anamorphically aspherized to provide even further astigmatic compensation and to accommodate for the user's intrinsic astigmatism.

The selection of an appropriate surface type for the posterior astigmatism correcting surface, and intermediate surface if used, depends on the type of progressive surface on the front surface. We present three such types of astigmatism correcting surfaces, (1) a radially symmetric asphere, (2) a two dimensional polynomial, and (3) an anamorphic asphere. The radially symmetric asphere is usually the best choice for correcting the astigmatism of progressive surfaces with radially symmetric power prescriptions. For lenses with a progressive "channel" the two dimensional polynomial or the anamorphic asphere are appropriate and experimentation will determine which surface class yields superior astigmatism correction. Further, the posterior surface, and possibly the intermediate surface, will be comprised of several sectors with different surface equations within each sector. Thus, one area of the lens surface is described by a different equation than the other areas. The technique of nonsequential ray tracing is then used to ray trace a surface described by several sectors. When it is desired that the lens surface be smooth and continuously differentiable, the lens designer must ensure that the surface sags and slopes match appropriately along all the sector boundaries by the appropriate choice of coefficients in each sector.

A rotationally symmetric aspheric surface can be represented by an equation of the general form:

$$z(h) = \frac{h^2 c}{1 + (1 - (1+k)c^2 h^2)^{\frac{1}{2}}} + A_1 h + A_2 h^2 + A_3 h^3 + A_4 h^4 + A_5 h^5 + \cdots + A_n h^n$$

In this equation, z is the sag height of the surface, h is the distance from the mechanical axis of the surface, c is the base curvature, k is the conic constant, and the $A_\#$'s are the rotationally symmetric polynomial coeffecients.

One particularly useful such equation is the 20th order form of the equation, shown below:

$$z(h) = ch^2/\{1+(1-[1+k]c^2h^2)^{1/2}\} + Ah^4 + Bh^6 + Ch^8 + Dh^{10} + Eh^{12} + Fh^{14} + Gh^{16} + Hh^{18} + Jh^{20},$$

where:

z is the sag in z direction, c is the radius of curvature at the pole of the surface, k is the conic constant $h^2 = x^2 + y^2$ An anamorphic surface is an aspheric surface with bilateral symmetry in both x and y but not necessarily with rotational symmetry. Such a surface is described by an anamorphic asphere equation. Such an equation is in the general form:

$$z(x, y) = \frac{x^2 cux + y^2 cuy}{1 + (1 - (1+kx)x^2 cux^2 - (1+ky)y^2 cuy^2)^{\frac{1}{2}}} +$$

$$AR\{(1-AP)x^2 + (1+AP)y^2\}^1 + BR\{(1-BP)x^2 + (1+BP)y^2\}^2 +$$

$$CR\{(1-CP)x^2 + (1+CP)y^2\}^3 + DR\{(1-DP)x^2 + (1+DP)y^2\}^4 +$$

-continued

...

In this equation, the surface sag, z, is computed at each point, (x,y), with cux defined as the base curvature in the x-direction, kx defined as the conic constant in the x-direction, cuy defined as the base curvature in the y-direction, and ky defined as the conic constant in the y-direction. The AR, BR, CR, DR, and any higher R terms define the rotationally symmetric coefficients of the higher order aspheric terms, and the AP, BP, CP, DP, and any higher P terms define the non-rotationally symmetric coefficients for the higher order aspheric terms.

A special case of such an equation is the 10th order form of the equation, shown below:

$$z = (c_x x^2 + c_y y^2)/\left(1 + \{1 - [1+kx]c_x^2 x^2 - [1+ky]c_y^2 y^2\}^{\frac{1}{2}}\right) +$$
$$AR[(1-AP)x^2 + (1+AP)y^2]^2 + BR[(1-BP)x^2 + (1+BP)y^2]^3 +$$
$$CR[(1-CP)x^2 + (1+CP)y^2]^4 + DR[(1-DP)x^2 + (1+DP)y^2]^5$$

in which:

$C_x$, $C_y$ are curvatures in x and y $k_x$, $k_y$ are conic coefficients in x and y AR, BR, CR, and DR are the rotationally symmetric portions of the 4th, 6th, 8th and 10th order deformations from the conic, and AP, BP, CP, DP represent the non-rotationally symmetric portions of the 4th, 6th, 8th, and 10th order deformations from the conic.

Finally, a two dimensional polynomial equation can be used. It has the following form:

$$z(x, y) = A_{00} +$$
$$A_{10}x + A_{01}y +$$
$$A_{20}x^2 + A_{11}xy + A_{02}y^2 +$$
$$A_{30}x^3 + A_{21}x^2 y + A_{12}xy^2 + A_{03}y^3 +$$
$$\ldots$$
$$= \sum_n \sum_m A_{nm} x^n y^m$$

Again, the sag height, z, is computed at each point, (x,y), of the surface. The values of the coefficients, Anm, determine the figure of the surface. It can be shown that a surface generated by either the rotationally symmetric asphere equation or the anamorphic asphere equation can be accurately represented by the polynomial equation given enough terms for the polynomial equation. The order of a term equals m+n.

It is well understood by those skilled in the art that surfaces can be described in many nearly equivalent functional forms or equations. Such alternative surface equations may be exactly equal to each other or differ by such a small amount that the optical performance of such surfaces would be indistinguishable within the tolerances of the human eye. Thus a radially symmetric aspheric surface within a specified aperture may be well approximated by a two dimensional Fourier series, a sum of Zernike polynomials, by a set of bicubic spline surfaces, or by many other functions. Similarly the anamorphic asphere can also be closely approximated by these and other functions.

The purpose of the astigmatic correcting surface applied to the posterior or intermediate surface of a progressive lens is to subtract out the perceptible unwanted astigmatism of the progressive surface. Further the eye is sensitive to changes of approximately 0.2 diopters of power and astigmatism in an ophthalmic lens. Thus if a surface is specified with a shape which nearly conforms to an anamorphic asphere surface such that the power is the same within 0.2 diopters over all 3 mm apertures to this anamorphic asphere surface, and the astigmatism magnitude and orientation are the same to within 0.2 diopters and 15 degrees over all 3 mm apertures to this same anamorphic asphere, then the surface will be understood to be similar enough to the anamorphic asphere surface be equivalent for present purposes. If a surface has a power within 0.2 diopters, an astigmatism magnitude within 0.2 diopters, and an astigmatism orientation to within 15 degrees of a radially symmetric polynomial over all of the 3 mm subapertures within the aperture of the surface used in an ophthalmic lens, then the specified surface and the radially symmetric polynomial are equivalent for present purposes. Similar tolerances apply to lenses that employ other surface shapes, such as a two-dimensional polynomial surface, to subtract out astigmatism.

As mentioned above, one embodiment of this invention is an ophthalmic optic with an anterior surface which comprises a distance power zone, an add power zone and a third optic zone in which there is a progression of power, an intermediate layer which is an anamorphic aspheric surface designed to subtract out the peripheral astigmatism of the anterior surface, and a posterior surface which is an aspheric surface designed to provide toric correction called for by a specific prescription and further minimize the residual astigmatism of the overall design.

A second preferred embodiment of this invention is an ophthalmic optic with an anterior surface comprising a distance power zone, an add power zone and a third zone in which there is a progression of power, and a posterior surface which is an aspheric surface designed subtract out the peripheral astigmatism of the front surface. The refractive index of the material of which the lens is fabricated is preferably above 1.50.

The fabrication of the ophthalmic lenses of the design disclosed herein begins with the fabrication of a lens preform, which consists of a front surface of specified geometry and a posterior surface whose geometry is that specified for the intermediate layer. The optical material may be a melt processable thermoplastic, such as polycarbonate of bisphenol-A, or a thermoset resin, such as diethylene glycol bisallyl carbonate. The material may be injection or compression molded, or cast molded using thermal or photochemical modes of initiation of polymerization, or a combination thereof. Preferably, the optical material has a refractive index exceeding 1.57. In one preferred fabrication process, as formed, the optical preform is designed to provide the exact distance and add power correction for a particular prescription, i.e., the preform may either be molded to prescription, or it may be made ahead of time, in quantity, covering a wide range of combinations of distance and add powers. For example, the number of different types of optical preform required to cover a prescription range of +6.00D to −6.00D and an add power range of 1.00D to 3.00D is 468. The preform may be coated on the anterior (convex) surface with any of a number of optical coatings, such as a scratch resistant, anti-reflective, photochromic or hydrophobic coatings, such coatings being applied by a thermal or a photochemical curing process.

The preform is then placed with its concave surface in juxtaposition to a toric mold with a molding surface designed to provide a toroidal aspheric optical quality surface upon casting, the space between the two surfaces (the posterior surface of the preform and the molding surface of the mold) is filled with a polymerizable resin, then the resin is polymerized to form a rigid, adherent layer attached to the preform, and permanently bonded to it. The angular orientation between the principal meridian on the convex surface of the preform and the toric axis of the mold is carefully adjusted prior to initiating polymerization of the resin, so that the toric axis is formed at the desired orientation. In the preferred fabrication method, this layer provides no spherical power at all, but provides the toric correction needed by a particular prescription. It should be noted however, that it is possible to add both spherical and toric power by adding surface castings to the concave surface.

The refractive index of the cast layer may be adjusted to be significantly lower than the material comprising the preform, in which case, the intermediate surface may be designed to provide optical benefit. In a second approach, the cast layer may be designed to have a refractive index closely matched to the refractive index of the preform, in which case, the intermediate surface provides no optical benefit. It may be noted that both design approaches have their advantages and disadvantages, and may be suitable for use in different prescription ranges. The first approach, emphasizing the contribution of the intermediate layer leads to a more complete neutralization of peripheral astigmatism, but produces a lens thicker at the edges, since the toric correction is provided by a material of relatively low refractive index. Such an approach may not be suitable for prescriptions above −3.00D of toric correction. The first approach may be suited for low to intermediate toric power corrections, and especially for prescriptions specifying high add powers, since the magnitude of peripheral astigmatism increases with add power. The second approach may also be suited for lenses provided for nontoric prescriptions, which constitute approximately 20% of all prescriptions.

Either of the two design approaches described above as well as either of the two fabrication methods outlined above can be used to provide a superior single vision lens in which both surfaces and when desired an intermediate layer may be utilized to form an aberration free optic, in which the usable optical zone is greater than what is available today.

The following nonlimiting example may be used to illustrate this invention.

EXAMPLE

A progressive addition surface was designed as shown in FIG. 1, which is characterized by a distance power zone (11), an intermediate zone (12), and an add power zone (13). The distance and add power zones are spherical, while the intermediate power zone is aspheric. The distance power was selected to be 0.0D, while the add power was 3.00D. The diameter of the add power zone was 26.0 mm, while the width of the annulus was held to 15.0 mm. The refractive index of the material of which the preform would be fabricated was assumed to be 1.59. The posterior surface of the preform which would constitute the intermediate layer in the finished design was designed to be a rotationally symmetric asphere with higher order terms.

This design shows the properties of a circularly symmetric progressive power lens with an intermediate corrective surface, utilizing an independent equation for each sector of the lens surface to represent the entire surface. The materials used n this design have a refractive index of 1.595 for the anterior material and 1.495 for the posterior material.

Since the lens itself may be described as having a distance portion, a progressive portion, and an add portion, it is natural to allow each of these portions to be described by its own mathematical function, and then knit these equations together at their boundaries to form a single seamless surface. This method can produce even more complex surface shapes which can more readily correct residual astigmatism in these lenses.

The design is for a zero diopter power distant region with a progressive power region which changes power linearly with radius from zero to three diopters from 30 mm diameter to 15 mm diameter, then has a constant three diopter power for the central 15 mm diameter of the add region. Thus, there are three sectors defined by this prescription: the zero power sector, the progressive sector, and the constant add sector.

Every sector in this particular design has three surfaces associated with it. There is the anterior surface, the intermediate surface, and the posterior surface. In this design, the zero power sector surfaces are all pure rotationally symmetric spheres with curvatures of 0.018397 mm−1, 0.01843 mm−1, and 0.018519 mm−1 for the anterior, intermediate, and posterior surface respectively.

To model the progressive power region, a rotationally symmetric function was selected since the add zone has rotational symmetry. Since the add zone is at the bottom half of the lens, a decentered and tilted 20th order aspheric equation was selected for both the anterior and intermediate surfaces, but only the even ordered terms are utilized. The parameters of the anterior surface are:

$c=0.023254$ mm$^{-1}$ $k=4.037618$ $A4=-0.138653\times10^{-5}$ mm$^{-3}$ $A6=-0.113202\times10^{-5}$ mm$^{-5}$ $A8=0.326801\times10^{-5}$ mm$^{-7}$ $A10=-0.161103\times10^{-5}$ mm$^{-9}$ $A12=-0.172200\times10^{-5}$ mm$^{-11}$ $A14=-0.116407\times10^{-5}$ mm$^{-13}$ $A16=0.140865\times10^{-5}$ mm$^{-15}$ $A18=0.161848\times10^{-5}$ mm$^{-17}$ $A20=-0.388621\times10^{-5}$ mm$^{-19}$ with the coordinate origin displaced −15 mm in the transverse y direction, 1.7 mm in the longitudinal z direction, and tilted 15.701 degrees.

The parameters for the intermediate surface are:

$c=584.795322$ mm$^{-1}$ $k=-40.770451$ $A4=0.177311\times10^{-5}$ mm$^{-3}$ $A6=-0.100372\times10^{-5}$ mm$^{-5}$ $A8=0.186359\times10^{-5}$ mm$^{-7}$ all other An=0.0 with the coordinate origin displaced −15 mm in the transverse y direction, 0.695 mm in the longitudinal z direction, and tilted 15.701 degrees.

The parameters for the posterior surface are:

$c=0.018519$ mm$^{-1}$ $k=An=0.0$

These equations are valid for the surface shape in the annulus of inner diameter 30 mm and outer diameter 15 mm, centered 15 mm below the mechanical center of the lens and tilted by 15.701 degrees.

To model the constant add power region, rotationally symmetric functions were again selected since the add zone has rotational symmetry. Since the add zone is at the bottom half of the lens and is at a constant power, a decentered and tilted sphere was utilized for the anterior, intermediate, and posterior surfaces with curvatures, c, of 0.023178 mm$^{-1}$, 0.018431 mm$^{-1}$, and 0.018519 mm$^{-1}$ respectively.

Thus, to describe each sector of a lens surface, three independent equations are used, and since there are 3 surfaces, 9 sets of parameters are required to specify the complete lens prescription.

Thus, to describe each sector of the lens surface, three independent equations were used, and since there are 3 surfaces, 9 sets of parameters were required to specify the complete lens prescription.

Lenses according to this invention possess unique advantages. Progressive addition ophthalmic lenses according to this invention can be free of astigmatism to a degree previously unattainable. The unwanted astigmatic error in such lenses can easily be reduced to 60% or 50% of the nominal add power of the lens. It is even possible, as shown above, to reduce unwanted astigmatism to within the range of 40% to 20% of the nominal add power of the lens.

This invention will now be defined by the following claims.

We claim:

1. An ophthalmic lens comprising (1) a first surface that causes astigmatic error and (2) a second surface including at least one portion that is shaped to subtract out the astigmatic error caused by the first surface, wherein the shape of the surface portion that subtracts out the astigmatic error is an anamorphic asphere, a radially symmetric asphere, or is defined by a two dimensional polynomial.

2. A lens according to claim 1, wherein the first surface is the anterior surface and the second surface is the posterior surface.

3. A lens according to claim 2 where the anterior surface is that of a progressive addition lens.

4. A lens according to claim 3, wherein the progressive surface comprises a progressive channel and the shape of the surface portion that subtracts out the unwanted astigmatism is an anamorphic asphere.

5. A lens according to claim 4, wherein the anamorphic asphere is defined by an equation of the following form:

$$z(x, y) = \frac{x^2 cux + y^2 cuy}{1 + (1-(1+kx)x^2 cux^2 - (1+ky)y^2 cuy^2)^{\frac{1}{2}}} +$$
$$AR\{(1-AP)x^2 + (1+AP)y^2\}^1 + BR\{(1-BP)x^2 + (1+BP)y^2\}^2 +$$
$$CR\{(1-CP)x^2 + (1+CP)y^2\}^3 + DR\{(1-DP)x^2 + (1+DP)y^2\}^4 +$$
$$\cdots$$

wherein s is the surface sag, cux is the base curvature in the x-direction, kx is the conic constant in the x-direction, cuy is the base curvature in the y-direction, ky is the conic constant on the y-direction, and AR, BR, CR, DR and any higher R term define the rotationally symmetric coefficients for the higher order aspheric terms, and AP, BP, CP, DP and any higher P terms define the non-rotationally symmetric coefficients for the higher order aspheric terms.

6. A lens according to claim 5, wherein the equation is of the 10th or lower order.

7. A lens according to claim 3, wherein the progressive surface comprises a radially symmetric power prescription and the shape of the surface portion that subtracts out the unwanted astigmatism is a radially symmetric asphere.

8. A lens according to claim 7, wherein the radially symmetric asphere is defined by an equation of the following form:

$$z(h) = \frac{h^2 c}{1+(1-(1+k)c^2 h^2)^{\frac{1}{2}}} + A_1 h + A_2 h^2 + A_3 h^3 + A_4 h^4 + A_5 h^5 + \cdots + A_n h^n$$

wherein z is the sag height of the surface, h is the distance from the mechanical axis of the surface, c is the base curvature, k is the conic constant, and each of the Ah numbers are the rotationally symmetric polynomial coefficients.

9. A lens according to claim 8, wherein the equation is of the 20th order or lower.

10. A lens according to claim 3, wherein the progressive surface comprises a progressive channel and the shape of the surface portion that subtracts out the astigmatism is defined by a two dimension polynomial of the following form:

$$z(x, y) = A_{00} +$$
$$A_{10} x + A_{01} y +$$
$$A_{20} x^2 + A_{11} xy + A_{02} y^2 +$$
$$A_{30} x^3 + A_{21} x^2 y + A_{12} xy^2 + A_{03} y^3 +$$
$$\cdots$$
$$= \sum_n \sum_m A_{nm} x^n y^m$$

wherein z is the sag height of the surface and each Anm is a coefficient.

11. A lens according to claim 1, wherein the lens is a homogeneous lens having a nominal add power and the unwanted astigmatism caused by the first surface is reduced to 60 percent of the nominal add power of the lens.

12. The lens of claim 11, wherein the first surface is the anterior surface and the second surface is the posterior surface.

13. The lens of claim 12, wherein the anterior is that of a progressive addition lens.

14. An ophthalmic lens comprising (1) at least two layers, each of which has a different index of refraction, (2) an anterior surface (3) a posterior surface, and (4) an interface surface between the layers, wherein at least one of the anterior surface, the posterior surface, and the interface surface causes astigmatic error and at least one of the other surfaces subtracts out that astigmatic error wherein the shape of the surface that subtracts out the astigmatic error is an anamorphic asphere, a radially symmetric asphere, or is defined by a two dimensional polynomial.

15. A lens according to claim 14 wherein the astigmatism is caused by the anterior surface.

16. An lens according to claim 14 wherein the anterior surface is that of a progressive addition lens.

17. A lens according to claim 16 wherein the progressive surface comprises a progressive channel and the shape of the surface that subtracts out the unwanted astigmatism is an anamorphic asphere.

18. A lens according to claim 17, wherein the anamorphic asphere is defined by an equation of the following form:

$$z(x, y) = \frac{x^2 cux + y^2 cuy}{1 + (1-(1+kx)x^2 cux^2 - (1+ky)y^2 cuy^2)^{\frac{1}{2}}} +$$

-continued $$AR\{(1-AP)x^2+(1+AP)y^2\}^1 + BR\{(1-BP)x^2+(1+BP)y^2\}^2 +$$
$$CR\{(1-CP)x^2+(1+CP)y^2\}^3 + DR\{(1-DP)x^2+(1+DP)y^2\}^4 +$$
$$\ldots$$

wherein s is the surface sag, cux is the base curvature in the x-direction, kx is the conic constant in the x-direction, cuy is the base curvature in the y-direction, ky is the conic constant on the y-direction, and AR, BR, CR, DR and any higher R term define the rotationally symmetric coefficients for the higher order aspheric terms, and AP, BP, CP, DP and any higher P terms define the non-rotationally symmetric coefficients for the higher order aspheric terms.

19. A lens according to claim 18 wherein the equation is of the 10th or lower order.

20. A lens according to claim 16, wherein the progressive surface comprises a radially symmetric power prescription and the shape of the surface that subtracts out the unwanted astigmatism is a radially symmetric asphere.

21. A lens according to claim 20, wherein the radially symmetric asphere is defined by an equation of the following form:

$$z(h) = \frac{h^2 c}{1+(1-(1+k)c^2h^2)^{\frac{1}{2}}} + A_1 h + A_2 h^2 + A_3 h^3 + A_4 h^4 + A_5 h^5 + \cdots + A_n h^n$$

wherein z is the sag height of the surface, h is the distance from the mechanical axis of the surface, c is the base curvature, k is the conic constant, and each of the Ah numbers are the rotationally symmetric polynomial coefficients.

22. A lens according to claim 21, wherein the equation is of the $20^{th}$ order or lower.

23. A lens according to claim 16 wherein the shape of the surface portion that subtracts out the astigmatism is defined by a two dimension polynomial of the following form:

$$z(x, y) = A_{00} +$$
$$A_{10}x + A_{01}y +$$
$$A_{20}x^2 + A_{11}xy + A_{02}y^2 +$$
$$A_{30}x^3 + A_{21}x^2y + A_{12}xy^2 + A_{03}y^3 +$$
$$\ldots$$
$$= \sum_n \sum_m A_{nm} x^n y^m$$

wherein z is the sag height of the surface and each Anm is a coefficient.

24. A lens according to claim 14 wherein the astigmatism is caused by the interface surface.

* * * * *